Jan. 8, 1952  MOHAMED ABDU HASSAN EL-SAID  2,582,018
THERMIONIC MULTIPLYING AND MEASURING CIRCUIT
Filed March 16, 1948  3 Sheets-Sheet 1

Control Grid Voltage

Plate Voltage

Inventor:
Mohamed A. H. El-Said
By his attorneys:
Baldwin, Wight, & Prevost

Jan. 8, 1952  MOHAMED ABDU HASSAN EL-SAID  2,582,018
THERMIONIC MULTIPLYING AND MEASURING CIRCUIT
Filed March 16, 1948  3 Sheets-Sheet 2
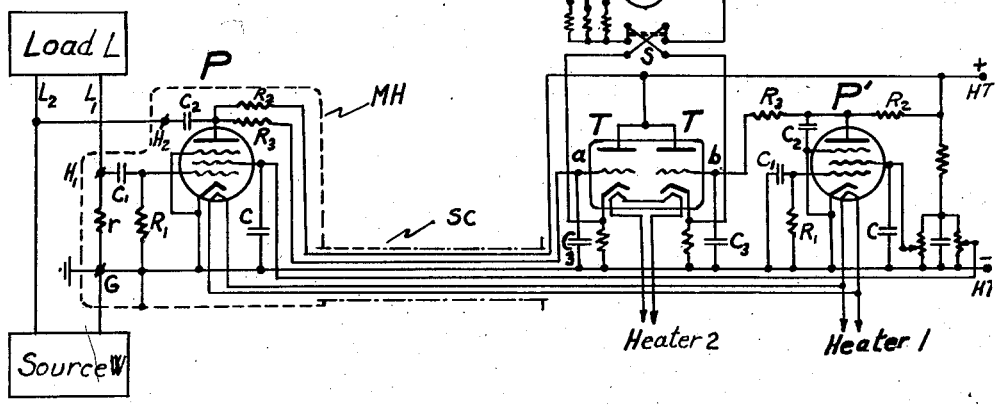
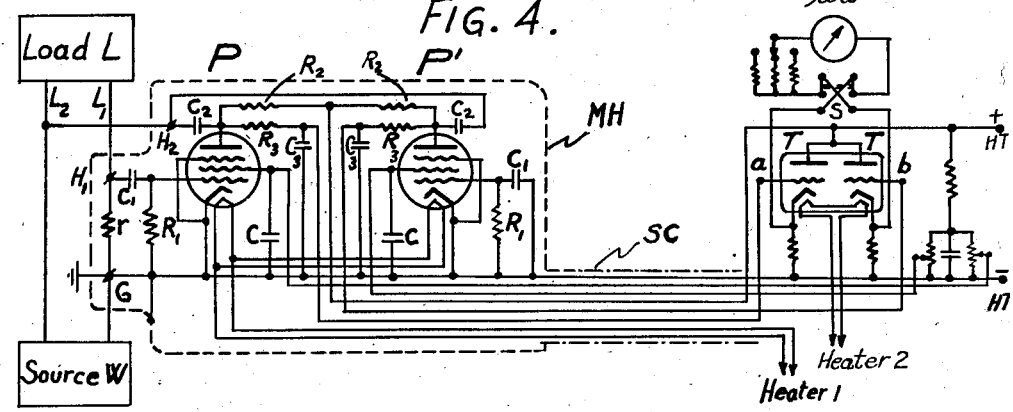
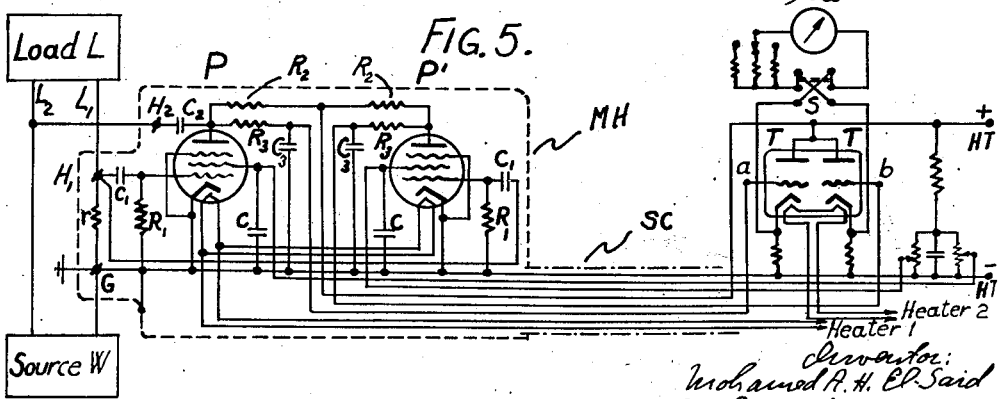

Jan. 8, 1952  MOHAMED ABDU HASSAN EL-SAID  2,582,018
THERMIONIC MULTIPLYING AND MEASURING CIRCUIT
Filed March 16, 1948  3 Sheets-Sheet 3

Inventor:
Mohamed A.H. El-Said
By his attorneys:
Baldwin, Wight & Prevost

Patented Jan. 8, 1952

2,582,018

UNITED STATES PATENT OFFICE 2,582,018

THERMIONIC MULTIPLYING AND MEASURING CIRCUIT

Mohamed Abdu Hassan El-Saïd, Giza, Egypt

Application March 16, 1948, Serial No. 15,236

6 Claims. (Cl. 171—95)

This invention relates to an improved mixer circuit, and has for its object to provide a simplified device for multiplying two independent electrical waves and measuring the average value of their product. Though not limited thereto, the invention is particularly applicable for use in connection with and is primary intended for measuring devices such as wattmeters and the like for measurements within the frequency range extending from the lowest audio frequency up to ultra high frequencies.

The invention may take the form of a general purpose measuring instrument, or may be part of a radio frequency generating equipment for the measurement of power, voltage, current, phase-angle and percent. modulation. Multiplying and measuring devices for such purposes must be reliable and predictable in performance and produce the required multiplication effect with a high degree of accuracy. The present invention enables these requirements to be satisfied by apparatus of simple and economical construction and arrangement.

According to the invention, the device comprises in combination two electron discharge paths, means for applying one of the waves to be multiplied to one path, means for applying the other of the waves to the other path, and means for taking the required multiplied output from one of the other of said paths, said paths being so arranged and operated that one operates within a family of characteristics as described hereinafter, and the other operates over a single exponential characteristic, the said paths being so pre-adjusted and coupled that the change in the average value of the output is proportional to the average value of the instantaneous multiplication of said two input waves. Further explanation of the principle provided by and utilized in the carrying out of the invention will be explained with relation to a thermionic tube circuit.

In the specification the term "mathematical power" of the exponential means the constant $b$ in the mathematical expression $e^{bx}$ where $x$ is a variable quantity.

According to the invention in a restricted aspect, a multiplying device comprises a thermionic tube having a cathode, a control grid, a plate and at least one grid therein between said control grid and said plate, means for applying one of the waves to be multiplied to the plate, means for applying the other of the waves to the control grid, means for applying a small constant direct current voltage to said one grid, and means for taking and measuring the average value of the required multiplied output from said plate; said thermionic tube is arranged and set to operate in that (1) for constant plate voltages, the plate current-control grid voltage family of characteristics are exponential for various values of plate voltages; (2) the mathematical power or index of the exponentials in (1) is constant and independent of plate voltage variations; (3) for any constant value of control grid voltage (within the exponential family of (1), the plate current-plate voltage characteristic is linear (conditions (1), (2) and (3) define fully the said family of characteristics as mentioned hereinbefore); (4) the control grid current-control grid voltage characteristic is exponential and completely independent of plate voltage variations (single characteristic); (5) the power of the exponential in (4) is larger than the power of the exponentials in (1). Under these conditions the plate current is accurately proportional to the product of a linear function of plate voltage and an exponential function of grid voltage over wide ranges, whereas the grid current is proportional to an exponential function of grid voltage only. These currents are in microamperes and determined by the Maxwellian initial velocity distribution and occur at grid voltages more negative than those for which the three-halves power law holds. In practice, in order to obtain such characteristics from standard multigrid tubes, it will be necessary to operate the tube under initial velocity conditions. For this purpose I found that, for instance, when the screen grid voltage of a tetrode or a pentode is reduced to a value near cathode potential, and the grid voltage is sufficiently negative such that a virtual cathode is formed near the grid, the tube yields the above described plate and grid current characteristics.

The invention as applied to a thermionic tube circuit, is illustrated in and further explained in connection with the accompanying drawings, in which:

Figure 3 illustrates in more detail the application of my invention to a wattmeter circuit employing a pair of multigrid tubes;

Figure 4 shows a modified form of the circuit illustrated in Figure 3;

Figure 5 shows a further modified form of the circuit of Figure 3;

Throughout the circuit diagram figures, the multiplying tube is shown as a pentode though a screen grid tube or a suitable multigrid tube can be used; also minor circuit details are omitted so as to simplify the figures so that they illustrate the invention clearly without being complicated by feed supply and similar circuit details known per se.

Figure 1:
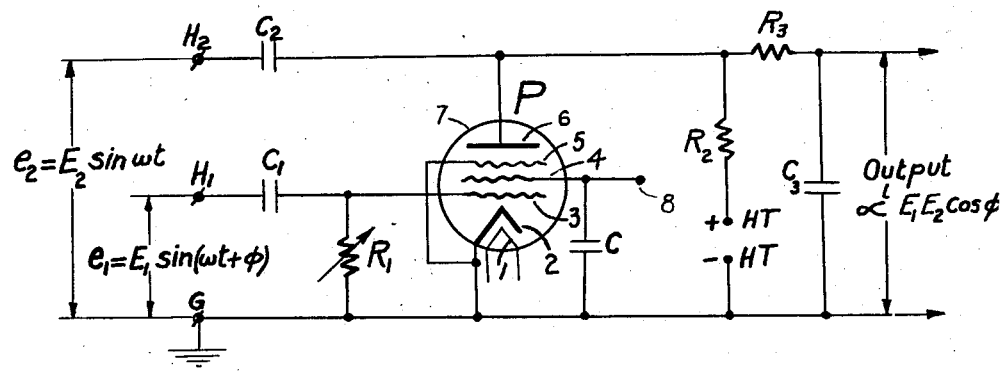
Figure 1 is a circuit diagram illustrating one preferred circuit of my invention.

Referring first to Figure 1 which illustrates in simplified diagram form an embodiment of a pentode P having a heater 1 for a cathode 2, a control grid 3, a screen-grid 4, a suppressor grid 5 and a plate 6, all enclosed in an envelope 7. The suppressor grid 5 is connected to the cathode 2 and both are connected to a terminal G which may be grounded; the screen grid 4 is supplied with a small positive potential from source indicated at 8 and by-passed to terminal G by capacitor C. For receiving tubes the required screen grid voltage may be anything between zero and ten volts, and may also be slightly negative with respect to the cathode. The two input waves to be multiplied are, for example, input voltages $e_1 = E_1 \sin(wt+\phi)$ and $e_2 = E_2 \sin wt$ and are applied respectively to the control grid 3 and plate 6 through appropriate coupling capacitors $C_1$ and $C_2$. The control grid 3 is connected to the cathode 2 through a grid leak resistor $R_1$ through which the direct current component of the control grid current circulates to the cathode 2. The plate 6 is supplied by a direct current polarizing potential from a source indicated at HT through a load resistor $R_2$. The capacitor $C_3$ has one terminal connected to the cathode 2 of the tube and the other terminal connected to the plate 6 of the tube through a filtering resistor $R_3$. The D. C. voltage across $C_3$ is the difference between the fixed voltage of the high tension source and the D. C. voltage drop across $R_2$ consequent upon the flow of the D. C. component of plate current. When the input waves $e_1$ and $e_2$ are not applied, D. C. voltage across $C_3$ is the standing plate voltage of the tube. When both $e_1$ and $e_2$ are applied, there will be a change in the D. C. component of plate current, thus producing a change in the D. C. voltage across $C_3$ which change will be referred to subsequently as the useful D. C. output voltage. The pentode P is set to operate within such a family of characteristics as will be explained with reference to Figures 2a and 2b the whole circuit has three input terminals $H_1$ for $e_1$, $H_2$ for $e_2$, and a common terminal G.

Figure 2A:
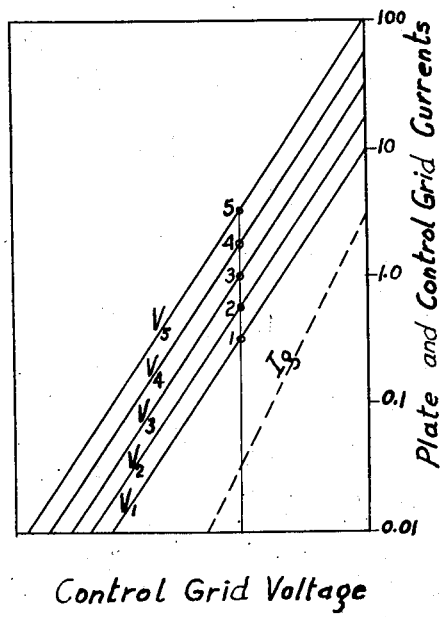
Figure 2a is a chart showing the plate and control grid currents versus control grid voltage as incidental to the circuit of Figure 1 of my invention.

In Figure 2a, which shows the plate current family of characteristics, and at the same time the control grid current single exponential characteristic, plate current and control grid current are plotted to a logarithmic scale against a linear scale of control grid voltage. The plate current family of characteristics is as shown a series of parallel straight lines indicated by $I_p$ for different values of plate voltages extending from 20 to over 400 volts (parallelism here means that the mathematical power or index of the exponentials is constant and independent of plate voltage).

The control grid current is as shown a single dotted straight line marked $I_g$ whose slope is higher than that of the parallel lines constituting said plate current family of characteristics, i. e. to say that the mathematical power or index of the exponential variation of said control grid current is larger than the mathematical power or index of the exponential variation of said plate current both with respect to said control grid voltage. It should be observed that the control grid current is not affected by variations in the plate voltage. Also the mathematical power of the exponentials represents the slope of the lines in Fig. 2a, and should correspond to the physical quantity $b = e/kT = 11600/T$ volts$^{-1}$ where $e$ is the electronic charge, $k$ is Boltzmann's constant, and $T$ is the absolute temperature of the cathode. However, I found that the value of the slope $b_g$ is usually slightly higher than the slope $b_p$ of the characteristics shown in Fig. 2a owing to electron focusing taking place in the tube.

Figure 2B:
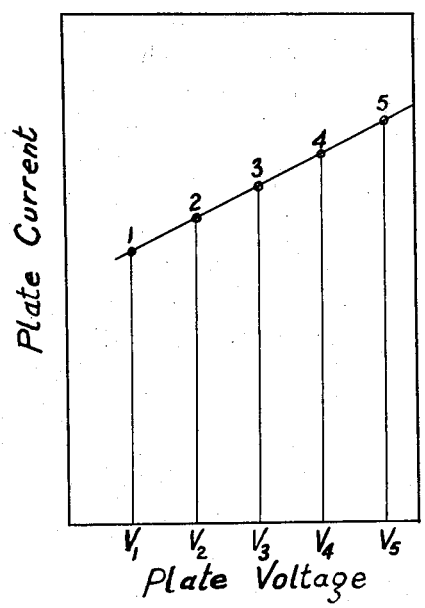
Figure 2b is a chart showing the relationship of plate voltage and plate current in the circuit of Figure 1.

In Figure 2b, which shows the manner in which variations in plate to cathode voltage affect plate current at a constant control grid voltage within the family of characteristics shown in Figure 2a, the same data in Fig. 2a but plate current is plotted against plate voltage both to the linear scale resulting in a straight line relationship. It should be understood that according to the invention, all straight lines taken at various control grid voltages (within the family of characteristics shown in Figure 2a), appear on Figure 2b as if the whole set of straight lines is concurrent at one point on the plate voltage axis. It should be clearly understood that though the tube characteristics shown alternatively in Figs. 2a and 2b are obtained for a constant screen grid voltage, the main features of these characteristics which are of interest in this invention hold for a reasonable range of the screen grid voltage which in most of the receiving types of tubes extends from zero up to about ten volts.

It will therefore be appreciated from Figures 1, 2a and 2b that the tube is initially set to operate with its plate positively polarized by a direct current voltage and with its control grid negatively polarized by the flow of grid current through the grid leak resistor $R_1$, which operation is such that applying a control grid voltage causes both control grid current and plate current to vary simultaneously in an exponential manner against control grid voltage, said control grid current varies faster than said plate current i. e. the slope $b_g$ of the $\ln I_g$ versus $V_g$ characteristic is higher than the slope $b_p$ of the $\ln I_p$ versus $V_g$ characteristic; while applying a voltage to the plate causes the plate current to vary linearly against plate voltage without said applied voltage to the plate affecting the control grid current. This operation of the tube imparts to it the property of multiplying the two input waves applied to its control grid and plate but also produces a plate rectification owing to the exponential grid curvature. This is by virtue of the fact that under above conditions, the plate current is accurately proportional to the product of a linear function of plate voltage and an exponential function of grid voltage over wide ranges.

It is now necessary to disclose more specifically the nature of the output of this circuit—under operating conditions imposed by the characteristics shown in Figures 2a and 2b—when either of the inputs is applied separately, and when both are applied simultaneously. Firstly, in the absence of the input wave $e_1$, the application of input wave $e_2$, should give zero useful output across $C_3$ i. e., the change in the D. C. voltage across $C_3$ is zero. This is owing to the linearity of the plate voltage-plate current characteristics. Secondly, in the absence of input wave $e_2$, the application of input wave $e_1$ produces plate rectification due to the exponential curvature of the plate current-grid voltage characteristics shown in Fig. 2a. But since also there is grid rectification produced by the exponential curvature of the grid current-grid voltage characteristic, the tube biases itself automatically to an operating point depending upon the magnitude of the grid leak resistor $R_1$ and the input wave $e_1$, such that when $R_1$ is too large, the change in the average component of the plate current is negative, while when $R_1$ is too small, the change in the average component of the plate current becomes positive; with the consequence that for a particular value of $R_1$ the application of input wave $e_1$ in the absence of input wave $e_2$ gives zero useful D. C. output voltage across $C_3$ which is desired. Physically, this particular adjustment of the grid leak resistor means that the rectified voltage developed by the control grid-cathode section of the tube by virtue of the change in control grid current consequent upon the application of input wave $e_1$, polarizes automatically the control grid to the proper operating point to compensate for plate rectification, with the consequence that the change in the D. C. component of plate current consequent upon the sole application of input wave $e_1$ is zero. Thirdly, and with $R_1$ particularly adjusted as desired, the application of input waves $e_1$ and $e_2$ simultaneously gives a useful D. C. output voltage across $C_3$ proportional to $E_1E_2 \cos \phi$. The circuit, however, with incorrect adjustment of the grid leak resistor gives an output which includes the term $E_1E_2 \cos \phi$ in addition to a term depending upon the input wave $e_1$ only. It is therefore clear that the contribution of the correct pre-adjustment of the grid leak resistor $R_1$ to the operation of the tube circuit as a multiplying device when both $e_1$ and $e_2$ are applied simultaneously is to make the useful D. C. output voltage of the tube a function of $E_1E_2 \cos \phi$ only; and that this multiplied output results only by the combination of the preadjusted control grid rectification characteristic caused by the curvature of the control grid single exponential characteristic and the plate current family of characteristics. The said control grid rectification characteristic can be preadjusted relatively to said plate current family of characteristics by resort to any conventional expedient, such for example as by adjusting the magnitude of $R_1$ or by means fixing the magnitude of $R_1$ at a suitable value and introducing a small preadjustable control grid bias to adjust the magnitude of the initial control grid current. I found that the correct adjustment corresponds to a first aproximation to the condition that $(\delta b_g I_g R_1 = 1)$ where $\delta = [(b_g/b_p) - 1]$ and $I_g$ is the standing grid current. Of course, before and during the adjustment, it will be necessary to readjust the screen grid voltage in order to restore the standing plate current to its preferred initial value. Such procedure of adjustment will be understood to those skilled in the art.

As has been previously described, the incorrect adjustment of the grid leak resistor $R_1$ makes the output of the device a function of $E_1E_2 \cos \phi$ in addition to a voltage function of the input wave $e_1$. It is possible to balance out the said voltage function in the output of the circuit by the use of another tube or section of a tube similarly responsive to the input wave $e_1$ and connected differentially with respect to the output of the tube shown in Figure 1. However, these arrangements will be described hereinafter.

Where the invention is to be employed to provide a wattmeter, the input wave applied to the plate of the multiplying tube will be a voltage wave proportional to the voltage across the connected circuit, while the input wave applied to the control grid of the same tube will be a voltage wave proportional to the current through the connected circuit.

In general, the invention can be practiced by means of one tube as shown in Figure 1, in which the output appearing across capacitor $C_3$ can be applied to and measured by a conventional degenerative direct current vacuum tube voltmeter or other equivalent arrangement known per se. For purposes of stability against supply voltage fluctuations, the performance of the circuit shown in Figure 1 is improved by incorporating a dummy tube P' similarly adjusted as P and connected to the degenerative voltmeter in a differential manner as shown in Figure 3.

Referring to Figure 3, which illustrates in a simplified diagram form a wattmeter according to the invention, an embodiment of two pentodes PP' although any other suitable tubes can be used, a twin triode TT employed as a degenerative voltmeter, and a microammeter $ua$. Pentode P which is the multiplying tube employing the arrangement shown in Figure 1, is housed in a measuring head MH connected by means of a screened cable SC to one input of the degenerative voltmeter at $a$ and whose other input is connected to the tube P' at $b$. Tube P' in this arrangement is a dummy tube and is not responsive to any of the input waves $e_1$ or $e_2$ but is similarly adjusted as tube P. The cathodes of the twin triode TT are connected together through the meter $ua$ in series with a suitable resistance. A reversing switch S is also provided so as to enable indication of the polarity of the D. C. potential between points $a$ and $b$. The plate-cathode section of the multiplying tube P is connected across the wires $L_1L_2$ connecting a source of power W to a power consuming load L and is considered as the voltage element of the wattmeter; while the control grid-cathode section of the tube, which section is considered as the current element of the wattmeter, is connected across a resistor $r$ which is inserted in series with one of the leads $L_1$ and through which the whole of the current passes through the power consuming load L. Designations of resistors and capacitors associated with the tubes PP' are essentially the same as those shown in Figure 1. In view of the description already given in connection with Figures 1, 2a and 2b, no further description of the circuit of Figure 3 is thought necessary except to point out that the indication given by the meter $ua$ is proportional to the average value of the instantaneous product of the voltage across, into the current through the wires $L_1$ and $L_2$, i. e. is proportional to the mean power passing from the source W to the load L. Also, the arrangement has the advantage that supply voltage fluctuations affect both circuits in a similar manner and therefore have minor effect upon the indicated reading of meter $ua$. It will be observed that the wattmeter is connected to the wires $L_1L_2$ in such manner that the resistor $r$ is on the load side and the side of source W at wire $L_1$ is connected to terminal G. It is, however, equally possible to connect the wattmeter so that the resistor $r$ is on the source side and the load side of wire $L_1$ is connected to terminal G, in which case of course the indicated reading of meter $ua$ will be in the reverse direction. Naturally, the circuit of Fig. 3 may well be simplified by totally omitting the dummy tube and its associated circuit and substituting it by a resistance divider across the high-tension source and connecting point $b$ to a suitable tap on the divider so as to balance out the effect of the standing plate voltage of the tube P upon meter $ua$. Such simplified arrangement will be readily understood by those skilled in the art.

The performance of the wattmeter described in connection with Figures 1 to 3 will be further described in relation to its accuracy at low power-factors. The accuracy of the wattmeter of this invention depends mainly upon the degree of linearity of plate current-plate voltage characteristics of the tube, and also upon the degree of correctly adjusting the control grid rectification characteristic. In general, the departure from perfect linearity of the plate current-plate voltage characteristic and an incorrect adjustment of the control grid rectification characteristic both produce undesired rectification characteristics in the multiplied output of the circuit which affect the accuracy. Such undesired rectification characteristics although may result in an error of only one percent of full output at unity power-factor, yet such error is magnified at low power-factors and it thus becomes advantageous to re-arrange the circuit shown in Figure 3 as will be described in connection with Figures 4 to 7, with the view of improving the accuracy of the measurements of power at very low power-factors.

Referring to Figure 4, which shows in a simplified diagram form a re-arrangement of the circuit shown in Figure 3, tube P' is therein connected such that its plate-cathode section is responsive to the voltage across the circuit while its control grid-cathode section is by-passed to terminal G and thus not responsive to the current through the circuit. The output from tube P and tube P' is balanced with respect to terminal G and is to be applied to the control grids of the degenerative voltmeter as has been shown in Figure 3. The advantage of this arrangement is to balance out the error in the output of the circuit due to any imperfect linearity in the plate current-plate voltage characteristic of tube P by means of producing a similar error from tube P'.

Referring to Figure 5, which shows in a simplified diagram form a re-arrangement of the circuit shown in Figure 3, tube P' is herein connected such that its control grid-cathode section is responsive to the current through the circuit while its plate-cathode section is by-passed to terminal G and hence not responsive to the voltage across the circuit. The advantage of this arrangement is to balance out the error in the output due to any imperfect adjustment of the grid leak resistor or control grid rectification characteristic for all values of input wave applied to the control grid of tube P by producing a similar error from tube P'.

Figure 6:
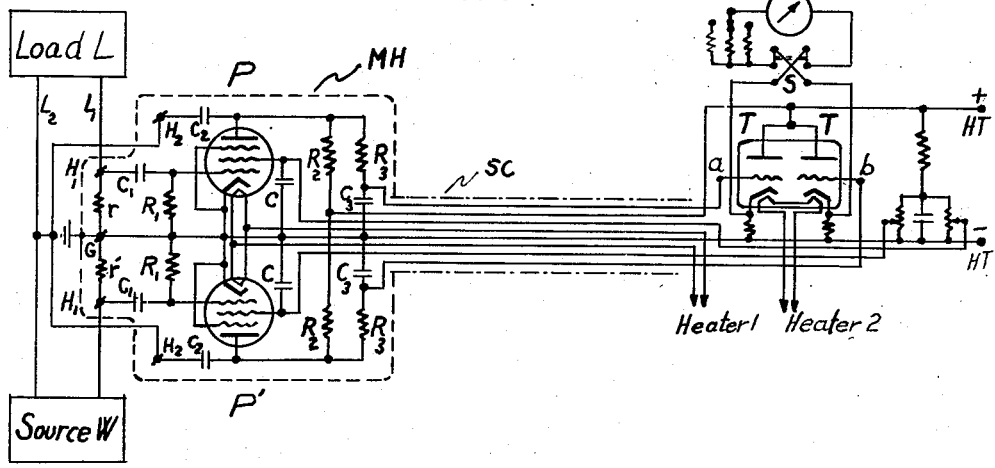
Figure 6 shows a still further modified form of the circuit, illustrated in Figure 3.

Referring to Figure 6, which shows in a simplified diagram form a re-arrangement of the circuit shown in Figure 3, tube P' is herein connected such that its plate-cathode section is responsive to the voltage across the circuit, while its control grid-cathode section is also responsive to the current through the circuit. It will be appreciated that in this arrangement, two resistors $r$ and $r'$ are inserted in series with the wire $L_1$ and that their junction point is connected to the cathodes of the tubes PP'. At any instant the voltage applied to the control grid of tube P is in antiphase with the voltage applied to the control grid of tube P'. This arrangement has three advantages, in that firstly, the error in the output due to imperfect linearity in the plate current-plate voltage characteristics of the two tubes is balanced out; secondly, the error in the output due to imperfect adjustment of the control grid circuits for all values of voltages applied to the control grids of the tubes, is also balanced out; and thirdly, that since both tubes are responsive to the power in the circuit, the output voltage across terminals $ab$ is twice the output of each tube alone.

Figure 7:
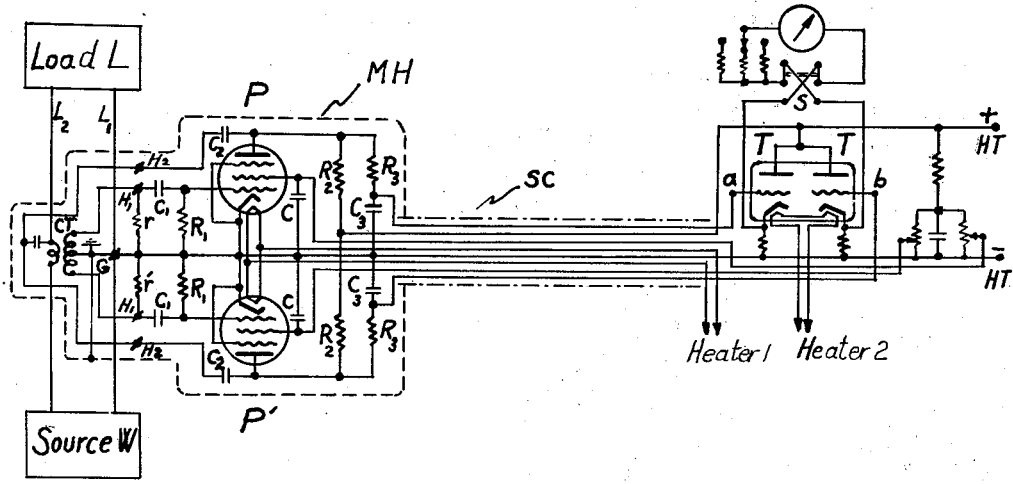
Figure 7 shows an application of the circuit of Figure 6 in which a system of transformer coupling is employed between the load circuit and the measuring circuit.

Referring to Figure 7, which shows in a simplified diagram form a re-arrangement of the circuit shown in Figure 3, the circuit herein is essentially that described in connection with Figure 6 except that a current transformer CT is used to supply the control grids of the tubes PP' with voltages proportional to the current through the circuit. It should be observed that the primary of the current transformer is inserted in series with wire $L_2$ and that the secondary of the transformer has a center tap connected to the cathodes of the tubes PP' while the end terminals of the secondary are connected to the corresponding control grids of the tubes PP'. This arrangement is particularly useful in connection with the measurement of the power output of large power radio frequency generators. The waveform of the applied alternating plate and grid voltages has some effect upon the accuracy of measurement by the circuit of Fig. 1. I found, however, that only second harmonic components in the applied alternating voltages affect the accuracy appreciably. With distorted waveforms the circuit of Fig. 1 can be used without any appreciable loss of accuracy by merely reducing the magnitude of the applied alternating grid voltage.

The effect of the phase-shift produced by the input circuits of the wattmeter of this invention upon the indicated reading of meter $ua$ at various power-factors will now be discussed. Referring to Figure 1, in order that the output of the circuit be proportional to $E_1 E_2 \cos \phi$, the time constant of the condenser $C_1$ associated with the equivalent resistance of the grid-leak resistor $R_1$ in parallel with the dynamic input resistance of the control grid-cathode section of the tube, must be equal to the time constant of the condenser $C_2$ associated with the equivalent resistance of the plate load resistor $R_2$ in parallel with the filter section $R_3 C_3$ and the dynamic resistance of the plate-cathode section of the tube. The fact that the phase-shift produced by the input circuits of the wattmeter affects the indicated reading of meter $ua$ has many interesting applications in practice. For example, the wattmeter of this invention can be used as a phase-angle meter. Referring to Figure 1, if the phase-angle $\phi$ between the input waves $e_1$ and $e_2$ is to be measured, then applying the two waves to the wattmeter as shown in Figure 1, and introducing a phase-shift in either of the input circuits or in both such that the output of the wattmeter is null, then the phase-angle φ between $e_1$ and $e_2$ is equal to the phase-shift introduced, by either input circuit or both combined. This null condition does not depend upon the amplitude of either input waves $e_1$ or $e_2$. One way of putting this property of the wattmeter into practice is by calibrating either of the input circuits or both in terms of phase-angle, but of course such arrangement depends upon frequency and upon a manual adjustment of the phase-shifting circuit although such manual operation can be carried out automatically by means of a servo system operated from the output of the wattmeter. Another way of using the wattmeter of this invention as a phase-angle meter, is by limiting the amplitudes of the input waves $e_1$ and $e_2$ by means of amplitude limiters well-known per se, the output of the wattmeter in this case becomes a direct reading of cos φ and the arrangement does not entail any manual adjustment.

Another important application in practice for the wattmeter described herein is for use as a percentage modulation meter. It is well-known that the power dissipated in a circuit due to the circulation of an unmodulated carrier is increased by fifty percent when the carrier is one hundred percent modulated; provided that the level of the carrier is unchanged by modulation. Therefore a wattmeter connected to such a circuit permits calibration as a percent modulation meter.

In some important applications in practice for the wattmeter of this invention, as for example, in connection with the measurement of the power output of large radio frequency power generating equipments, the voltage across the circuit to which the wattmeter is connected, exceeds the useful range of the plate current-plate voltage characteristic of the incorporated multiplying tubes. Also the current through the circuit to which the wattmeter is connected may be so large that the use of resistive shunts may not be of any advantage. In these cases, the wattmeter of this invention will have to be associated with special multipliers which bring down the voltage across and the current through the circuit to the appropriate ranges of the wattmeter. A voltage multiplier may take the form of a capacitive voltage divider or a resistive attenuator well known per se depending upon the advantages gained by the use of either arrangement at the operating frequency. A current multiplier may take the form of a current transformer or a reactive shunt well known per se depending also upon the advantages gained by the use of either arrangement at the operating frequency.

Also, owing to the high sensitivity of the wattmeter of this invention and hence its susceptibility to pick up from external fields, it is necessary, where the wattmeter is used in the vicinity of a strong field, to provide for adequate shielding of the wattmeter, particularly the measuring head; and in certain cases where the field is extremely strong, double shielding may be necessary.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A thermionic multiplying circuit for obtaining the average product of two alternating voltages comprising a multigrid tube having a cathode, a grid, a plate, and at least a screen grid, means for predetermining the operation of said tube under initial velocity conditions by applying a fixed potential to the screen grid whose value is near cathode potential and biasing the grid at a sufficiently negative voltage so as to form a virtual cathode near the grid thus resulting in a plate current being proportional to the product of a linear function of plate voltage into an exponential function of grid voltage together with a grid current proportional to another exponential function of grid voltage substantially independent of plate voltage, means for applying a fixed positive potential to the plate, grid leak resistor means providing the circulation of grid current to cathode thus initially biasing the grid negatively, input circuit means for applying one and the other of said two alternating voltages respectively to the plate and grid, grid current rectification means for deriving from the alternating grid voltage an automatic grid bias to compensate for average plate rectification including means for readjusting said derived automatic grid bias such that the sole application of alternating grid voltage produces no change in the average component of plate current whereas the simultaneous application of alternating plate and grid voltages produces a change in the average component of plate current which change is proportional to the average value of the instantaneous product of said alternating plate and grid voltages, whereby said average product is a result of the product relationship of plate current in which plate rectification is compensated by using grid current to produce grid rectification.

2. A multiplying circuit for obtaining the average value of the instantaneous product of two alternating voltages comprising a multigrid tube having a cathode, a grid, a plate, and at least a screen grid, power supply means for predetermining the operation of said tube under initial velocity conditions such that applying a voltage to said grid causes both plate and grid currents to vary simultaneously in an exponential manner with said applied voltage to grid, said grid current varying faster than said plate current, and such that applying a voltage to said plate causes the plate current to vary linearly with said applied voltage to plate without affecting said grid current, a resistor connected between grid and cathode providing circulation of grid current to cathode, means for applying one input alternating voltage to said plate, means for applying a second input alternating voltage to said grid through a coupling capacitor, means for positively polarizing the plate through a load resistor, means for taking a useful D. C. output voltage from said plate, and grid rectification means so adjusted by said resistor that said useful D. C. output voltage is proportional to the average value of the instantaneous product of said two applied alternating voltages, whereby multiplication is obtained by the combination of said variations in plate and grid currents consequent upon the application of said two alternating voltages together with the adjustment of said grid rectification means to compensate for plate rectification caused by said exponential plate current grid voltage variation.

3. A multiplying device as set forth in claim 1, wherein means is provided for applying a constant direct current voltage to said screen grid, by-pass capacitor means for screen grid, means for polarizing said plate from a direct current source through a load resistor, initial grid biasing means providing the circulation of the grid current to the cathode through a grid leak resistor, means for applying one input alternating voltage to said plate, means for applying a second input alternating voltage to said grid, resistor-capacitor filter means for deriving from said plate an output a direct current voltage developed across said load resistor, means for pre-adjusting said grid leak resistor as one means for preadjusting said automatic grid bias to compensate for said plate rectification such that said output is proportional to the average value of the instantaneous product of said two input alternating voltages, and final means for measuring said output.

4. A multiplying device as set forth in claim 1, wherein said thermionic tube is a pentode having a cathode, a grid, a screen grid, a suppressor grid and a plate, means for applying a constant direct current voltage to said screen grid, by-pass capacitor means for screen grid, means for connecting said suppressor grid to said cathode, means for polarizing said plate from a direct current source through a load resistor, initial grid biasing means providing the circulation of the grid current to the cathode through a grid leak resistor, means for applying one input alternating voltage to said plate, means for applying a second input alternating voltage to said grid, resistor-capacitor filter means for deriving from said plate an output a direct current voltage developed across said load resistor, means for pre-adjusting said grid leak resistor as one means for preadjusting said automatic grid bias to compensate for said plate rectification such that said output is proportional to the average value of the instantaneous product of said two input alternating voltages, and final means for measuring said output.

5. An alternating current electronic wattmeter in which is used a multiplying circuit as set forth in claim 1, including means for applying a voltage input as said one input alternating voltage, means for applying another voltage input as said other input alternating voltage, said inputs being respectively proportional to the voltage and current respectively across and through the circuit whose power is to be measured, resistor-capacitor filter means for taking a direct current output as said multiplied output from said multiplying circuit and final means for measuring said output by a direct current vacuum tube voltmeter including a meter and a means for balancing out the effect of the standing plate voltage of said multiplying circuit upon said meter.

6. A multiplying device as set forth in claim 1, wherein said multigrid tube is a pentode having a cathode, a grid, a screen grid, a suppressor grid, and a plate, means for applying a direct current voltage to screen grid, by-pass capacitor means for screen grid, means for connecting the suppressor grid to cathode, means for polarizing said plate from a direct current source through a load resistor, initial grid biasing means providing the circulation of grid current to cathode through a grid leak resistor, means for applying one input alternating voltage to the plate, means for applying a second input alternating voltage to the grid through a coupling capacitor, resistor-capacitor filter means for deriving from said plate a direct current output voltage, means providing an adjustable direct current biasing potential in series with said grid leak resistor for varying the standing grid current as one means for preadjusting said automatic grid bias to compensate for said plate rectification such that said output is proportional to the average value of the instantaneous product of said two input alternating voltages, and final means for measuring said output.

MOHAMED ABDU HASSAN EL-SAID.

REFERENCES CITED

The following references are of record in the file of this patent:

UNITED STATES PATENTS

| Number | Name | Date |
|---|---|---|
| 1,586,533 | Peterson | June 1, 1926 |
| 1,936,414 | Stone | Nov. 21, 1933 |
| 2,009,069 | Pray | July 23, 1935 |
| 2,037,202 | Terman | Apr. 14, 1936 |
| 2,129,880 | Scherbatskoy et al. | Sept. 13, 1938 |
| 2,156,088 | Heising | Apr. 25, 1939 |
| 2,232,856 | Idle | Feb. 25, 1941 |
| 2,267,184 | Bagno | Dec. 23, 1941 |
| 2,314,851 | Barney et al. | Mar. 23, 1943 |